United States Patent
McConnon

[11] 3,861,472
[45] Jan. 21, 1975

[54] HORSESHOE WITH FLEXIBLE SECTIONS

[76] Inventor: Edward McConnon, 51 Shumpike Rd., Springfield, N.J. 07081

[22] Filed: Apr. 11, 1973

[21] Appl. No.: 350,042

[52] U.S. Cl. ................................................ 168/15
[51] Int. Cl. ............................................. A01l 7/02
[58] Field of Search ............. 168/13, 14, 15, DIG. 1

[56] References Cited
UNITED STATES PATENTS
2,024,265   12/1935   Anderson et al. ..................... 168/13
2,157,826   5/1939   Kearney ............................... 168/13

*Primary Examiner*—Robert Peshock
*Assistant Examiner*—J. Q. Lever
*Attorney, Agent, or Firm*—Nicholas De Benedictis

[57] ABSTRACT

An essentially rigid horseshoe having downwardly flexible heel sections permits the use of full fitting and supporting horseshoes especially on race horses. The flexible heel sections of the shoe prevent overreaching by the horse from pulling off the horseshoe by flexing downwardly out of the way of the overreaching hoof.

3 Claims, 3 Drawing Figures

PATENTED JAN 21 1975  3,861,472

45° DEFLECTION

SECTION A-A

HORSESHOE WITH FLEXIBLE SECTIONS

BACKGROUND OF THE INVENTION

1. Field of the Invention

This invention concerns horseshoes and particularly rigid horseshoes having flexible heel sections that are especially useful on racing horses.

2. Description of the Prior Art

Horses, when running, sometimes overreach, that is their rear hoof when reaching forward strikes the heel of a front hoof. Overreaching often results in the front horseshoe being knocked off when struck by the overreaching rear hoof. This usually results in the horse breaking stride thereby loosing speed and sometimes causes the horse to trip and fall at great risk to the life and limb of both the rider and the horse.

To prevent the loss of a horseshoe caused by overreaching horses and especially race horses are shod with slightly undersized horseshoes so that the heel of the shoe does not extend all the way back on the hoof which prevents the toe of an overreaching hoof from striking the horseshoe on the front hoof. However there are serious disadvantages in undersizing the shoe to prevent the loss of a shoe from overreaching. An undersized shoe does not provide proper support for the horse since part of the heel section of the hoof is not supported which can result in lameness and even various hoof and leg maladies.

Previous flexible or resilient horseshoes were designed to cushion the hoof and to obtain increased traction on wet or slippery surfaces. However such shoe designs neither contemplated nor solved the problem of overreaching. Examples of such horseshoes are disclosed in U.S. Pat. Nos. 3,513,915; 2,024,265 and 158,284.

U.S. Pat. No. 3,513,915 issued to H. G. Sherman disclosed a resiliently flexible sheet interposed between the bottom of the horse hoof and the rigid horseshoe section. Although the edge of the flexible sheet extends slightly beyond the edge of the shoe, the extending edge does not have full depth of the shoe and therefore neither touches the ground nor gives support to the horse hoof in areas that the flexible sheet extends beyond the edge of the shoe. The protruding edge merely functions as a bumper to prevent lacerations etc. as discussed in column 1, lines 42 to 48 of the patent.

U.S. Pat. No. 2,024,265 issued to Anderson et al. discloses a rigid (metal) horseshoe core encapulated in a resilient flexible material. However, the heel sections of the shoe are not flexible in a generally downward direction to prevent the shoe from being knocked off by overreaching.

U.S. Pat. No. 158,284 issued to M. R. Kintzing et al. employs rubber strips as cushions but does not provide downward flexibility for the heel sections of the horseshoe.

Summary of the Invention

Essentially rigid generally U-shaped shoes for horses and similar hooved animals are significantly improved by constructing the shoe with downwardly flexible sections. The improved shoe comprises a rigid generally U-shaped member having attached to both ends flexible members having about the same thickness as the rigid member and constructed of material sufficiently flexible to bend at least 20° when subjected to a force acting generally downward on the rear edge of the flexible member and having a magnitude insufficient to pull off said shoe from the hoof, said flexible member extending from the rigid member between ⅛ inch and one inch to continue the general U-shape of the shoe and form flexible heel sections of the shoe. The flexible rear sections of the shoe are constructed with flexible material and preferably the flexible material continues around the top foot bearing surface of the rigid section of the shoe to join the two rear sections with flexible material and to form a resilient top foot bearing layer on the rigid section of the horseshoe.

DETAILED DESCRIPTION OF THE INVENTION

Conventional, generally U-shaped rigid horseshoes can be produced from rigid materials such as iron, aluminum, steel, high density polymers and similar durable materials. Their advantages are their greater support, durability and strength. Furthermore, rigid horseshoes are easier to securely attach to the hoof than flexible shoes.

Rigid type shoes are improved by this invention when the rear (heel) sections are cconstructed entirely of flexible material. These flexible sections should be between ⅛ inch and 1 inch long.

The flexible material can be adhered to the rigid material by any suitable means, such as conventional cements or glues or mechanically bound by such means as dove tailing or pegging. The means for attaching the flexible section is not critical to the practice of this invention. The strength of the bond is not critical although strong bonds are preferred. The breaking of the bond during overreaching, though not desired merely results in the breaking away of the rear section of the horseshoe which does not have the serious effect of a pulled horseshoe.

Suitable flexible materials are those which flex at least 20° and preferably about 45° when subjected to a downwardly acting force having a magnitude less than the force required to knock off the horseshoe (about 300 pounds) but greater than about ½ pound force. Examples of such flexible material include both natural and synthetic rubber such as butyl rubber, polyisobutylene, polyisopreme and flexible polymers and copolymers such as polyethyelene, polyurethane and polypropylene of low to moderate molecular weight (about 300 to 5,000), ethylene-propylene Copolymer, and the like.

The flexible heel section should be at least ⅛ inch long and preferably between ⅛ inch and one inch with about ½ inch particularly preferred. The longer the flexible section the more rigid the flexible material can be and still provide the required degree of bending since the length of the flexible section when bent is the arc length of the curve having the angle of at least 20°. Longer arc lengths require less curvature or bend per unit length in order to transverse the same angle. Therefore the length of the flexible section is selected in combination with the specific flexible material chosen in order to provide the required degrees of flex.

Among the suitable flexible materials, the more rigid are preferred in combination with the longer lengths for the flexible sections in order to obtain the required degree of flex in combination with the maximum amount of support and durability afforded by the more rigid materials.

Figure 2:
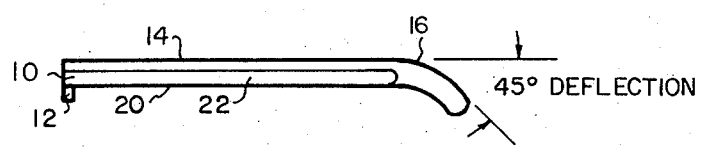
FIG. 2 depicts the horseshoe of FIG. 1 in a side elevation view with the flexible heel of the shoe flexed to an angle of 45°.

The required degree of deflection is depicted in FIG. 2. The force F deflects the flexible sections 16 at least 20° (45° are shown) from the plane of the rigid section 20 of the horseshoe. FIG. 2 depicts the preferred embodiment of the invention in which the flexible sections 16 are about ½ inch long and constructed of medium weight polyurethane. The polyurethane top layer 14 of the horseshoe is above the rigid material portion 22 of the rigid section of the shoe and is continuous with the flexible sections 16. The polyurethane top layer of the rigid section and the flexible sections are preferably a single piece of polyurethane. The section of polyurethane over the rigid material forms a resilient layer which functions as a cushion and also assists in bonding the flexible sections to the rigid section since the top layer of the rigid section is one piece with the flexible sections. The thickness of the resilient layer 14 can vary depending upon the resiliency of the flexible material. Thicknesses between 1/16 and 3/16 of an inch are preferred.

Figure 1:
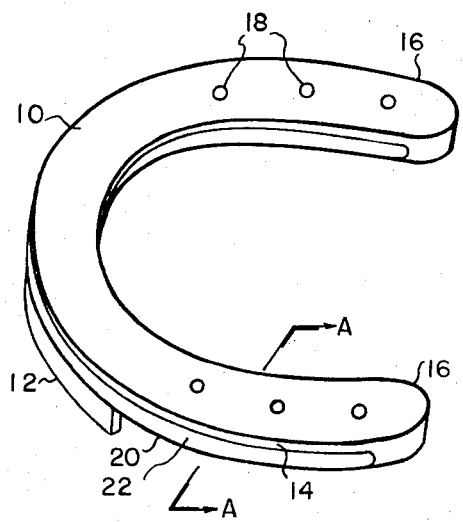
FIG. 1 depicts the horseshoe in a perspective view.

The shape of the horseshoe is not critical to the invention and as shown in FIG. 1, the overall horseshoe 10 is preferably of convention shape having a toe cleat 12; spaced nail holes 18; a rigid section 20 comprising a resilient layer 14 and rigid material 22 that forms the lower portion of the shoe which in use contacts the ground; and flexible sections 16 having at least about full horseshoe depth at the heel of the shoe.

Figure 3:
FIG. 3 is a sectional view along line A, A' of the horseshoe of FIG. 1.

FIG. 3 is a sectional view along A—A of the rigid section of the horseshoe shown in FIG. 1 and shows the preferred embodiment in which the flexible material of the flexible sections (not shown) continues around the top of the horseshoe as a thin top resilient layer 14 of the rigid section 20 with the rigid material 22 forming the bottom portion of the rigid section 20.

What I claim is:

1. A shoe for horses and similar hooved animals comprising a rigid generally U-shaped member having attached to both ends flexible members having about the same thickness as the rigid member and constructed of material sufficiently flexible to bend at least twenty degrees when subjected to a force acting generally downwardly on the rear edge of the flexible member and having a magnitude insufficient to knock off said shoe from the hoof, said flexible member extending rearwardly from the rigid member between one eighth inch and one inch to continue the general U-shape and forming flexible heel sections of the shoe whereby a shoe is obtained that will not be knocked off when struck by an overreaching hoof because the flexible heel section flexes down out of the way of the overreaching hoof.

2. The horseshoe of claim 1 in which the flexible material is polyurethane.

3. The horseshoe of claim 1 in which the rigid member has a top layer of flexible material, said top layer being of the same material as the flexible members and forming one continuous piece with the flexible members.

* * * * *